Nov. 22, 1938.    L. E. GOODWIN    2,137,771
ICE FISHING TIP-UP
Filed April 5, 1937    2 Sheets-Sheet 1
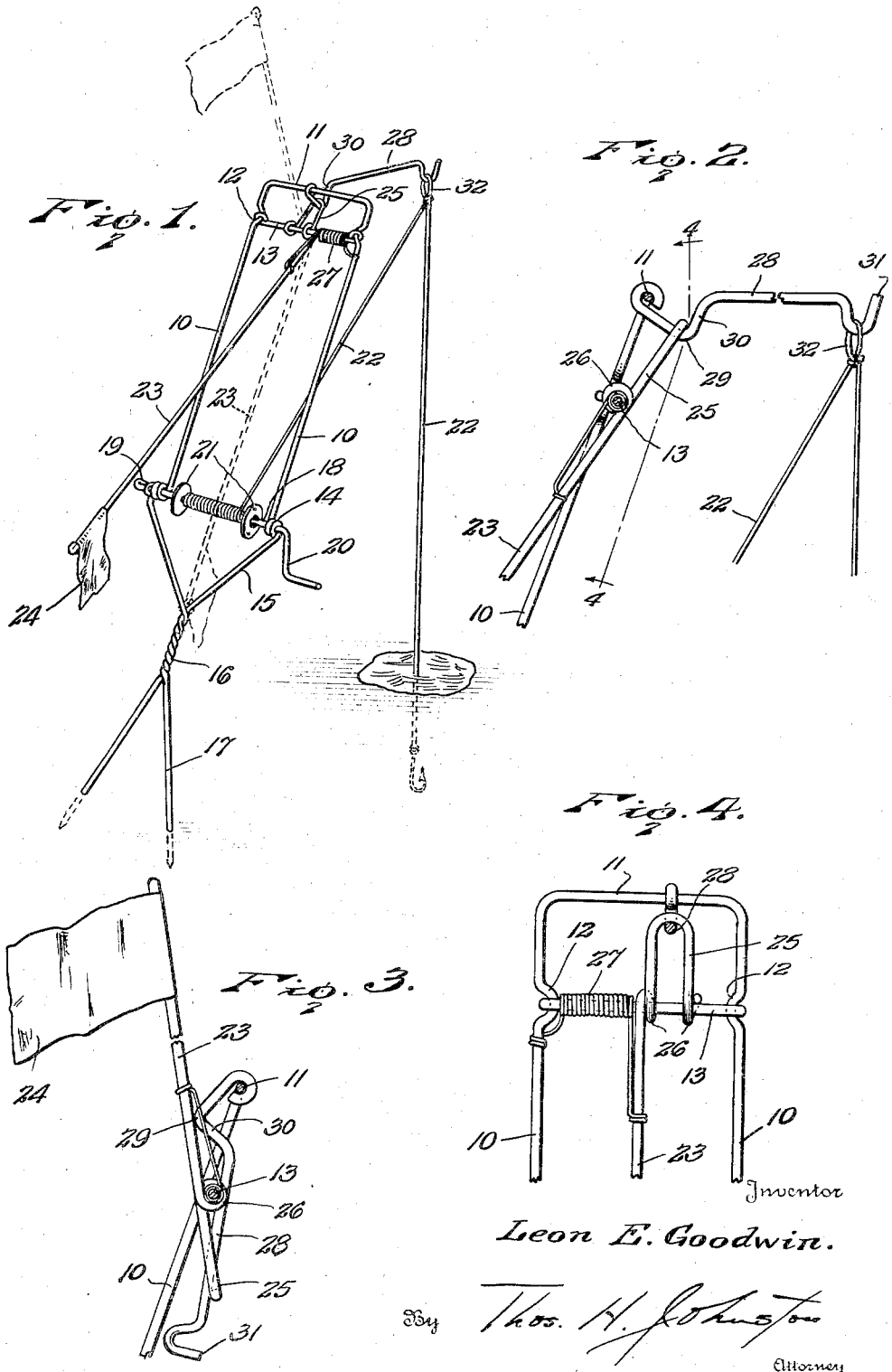

Nov. 22, 1938.                L. E. GOODWIN                    2,137,771
                             ICE FISHING TIP-UP
                           Filed April 5, 1937              2 Sheets-Sheet 2

Inventor
Leon E. Goodwin.
By Thos. H. Johnston
Attorney

Patented Nov. 22, 1938

2,137,771

UNITED STATES PATENT OFFICE 2,137,771

ICE-FISHING TIP-UP

Leon E. Goodwin, North Amity, Maine

Application April 5, 1937, Serial No. 135,148

8 Claims. (Cl. 43—16)

This invention relates to an improved ice-fishing tip-up and seeks, among other objects, to provide a simple, inexpensive and yet unusually efficient device of this character adapted to automatically signal a fisherman when a fish is caught.

The invention seeks, as a further object, to provide a device embodying a spring actuated signal arm on which will be arranged a suitable flag, wherein a trigger will be provided for retaining the arm in lowered position and holding the device set, wherein a reel will be provided for the fishing line so that a fish, when caught, will be allowed to run, and wherein pull upon the line by the fish will trip the trigger, when the signal arm will be swung up to display the flag and signal that the fish has been caught.

Another object of the invention is to provide a device which may be readily engaged with the ice adjacent a hole therein and quickly and easily set so that the line will extend freely through the hole in the ice, wherein the device will securely engage the ice so that the device cannot be easily dislodged by a fish caught on the line, and wherein, when so desired, the device may, simply by jerking upwardly thereon, be readily released.

And the invention seeks, as a still further object, to provide a device which will be sturdy in construction and which may be formed entirely of suitable wire.

Other and more detailed objects of the invention will appear during the course of the following description and in the drawings which form a part of this application, Figure 1 is a perspective view showing the device set.

Figure 2 is an enlarged detail section particularly showing the trigger and how the signal arm is held in lowered position when the device is set.

Figure 3 is a view similar to Figure 2 but showing the trigger tripped.

Figure 4 is a detail section on the line 4—4 of Figure 2 and particularly showing the trigger engaging latch loop of the signal arm.

Figure 5:
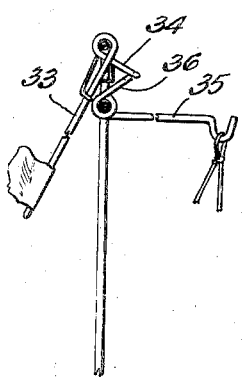
Figures 5, 6, 7 and 8 are detail sectional views showing modified forms of triggers and latch members.

In carrying the invention into effect, I employ a frame embodying sides 10 connected at their upper ends by a cross bar 11, the frame being preferably formed from a single length of suitable resilient wire. As will be observed, the sides of the frame at the upper portion thereof are straight and parallel so that the upper portion of the frame is oblong in general contour and formed in said sides near the cross bar 11 are bowed portions 12. Looped at its ends about said bowed portions is a cross rod 13 which, preferably, is also of suitable resilient wire and extends in spaced parallel relation to the cross bar 11, the bowed portions 12 limiting the rod against movement along the sides of the frame.

Approximately midway between the ends of the frame, the sides 10 thereof are bent to form aligned bearing loops 14 below which said sides are brought together in V-shape, as indicated at 15, and are thence twisted together, as indicated at 16, to form a connection between the sides whence said sides extend in inverted V-shape to form diverging ice engaging prongs 17. The twisted connection 16 between the sides 10 will, of course, obviate spreading of the sides at the loops 14 as well as rigidly unite the prongs 17 at their upper ends.

Journaled through the loops 14 is a reel shaft 18 preferably of suitable resilient wire. At one end, this shaft is bent over, as at 19, for limiting the shaft against displacement while at its opposite end, the shaft is formed with a crank 20 and mounted on the shaft are washers 21 cooperating with the shaft to provide a reel for a fishing line, a conventional line being shown at 22. As will be appreciated, the line may be wound on the reel by manually turning the crank 20 and, as will be noted, the reel shaft is flattened to provide stops spacing the washers 21 from the sides 10 of the frame so that the line will not twist around the bearings 14 and the reel will have free play.

Swingingly mounted upon the cross rod 13 is a signal arm 23 equipped at its outer end with a suitable flag 24. The arm 23 is preferably formed of suitable resilient wire bent near the inner end of the arm to provide a U-shaped latch loop 25 lying, as best seen in Figure 4, at one side of the arm in a plane therewith and formed at the base of said loop are aligned eyes 26 journaling the signal arm upon the rod 13. Coiled about the rod 13 is a spring 27 one end of which is attached to the adjacent side of the frame while the opposite end of said spring is attached to the signal arm 23 for swinging the arm upwardly to active position, as shown in Figure 3, and normally holding the arm upward to display the flag 24.

Looped at one end about the cross bar 11 of the frame is a swingingly mounted trigger 28 which, like the other parts noted, is also preferably formed of suitable resilient wire. Near its inner end, the trigger is bent to form a crotch 29 providing a shoulder 30 extending in angular relation to the length of the trigger and formed at the outer end of the trigger is a hook 31 about which the line 22 is, at a suitable point in the length thereof, looped or otherwise detachably connected, the line being shown in the present instance as provided with a slip loop 32 engaged over the hook. As will be observed, the trigger 28 extends freely through the latch loop 25 of the signal arm 23.

In use, the prongs 17 of the frame are, as shown in Figure 1, forced into the ice adjacent a suitable hole therein for supporting the frame in upwardly inclined position leaning toward the hole and, in this connection, it is to be noted that as the prongs are pushed into the ice, the free end portions of said prongs will be spread somewhat so that the prongs will thus be brought under tension.

If necessary, sockets may be formed in the ice to receive the prongs 17 and, due to the tensioning of the prongs as they are pushed downwardly, said prongs will be caused to resiliently grip the ice for effectively supporting the device in upright position and securing the device to the ice. At the same time, however, the device may, due to the resiliency of the prongs, be readily detached or released from the ice, when so desired, simply by jerking upwardly upon the frame, the necessity for chiseling the device free thus being obviated.

Having secured the device in position, as just described, the signal arm 23 is swung downwardly to inactive position when, as best brought out in Figure 2, the trigger 28 is swung up until the latch loop 25 seats in the crotch 29 in front of the shoulder 30. By then releasing the signal arm, the latch loop will, due to the spring tension on the arm, be caused to frictionally coact with the shoulder 30 for holding the trigger against downward movement and maintaining the device set, the free end of the line 22 with a suitable hook thereon extending downwardly through the hole in the ice into the water.

As will now be seen, when a fish, upon being caught, pulls upon the free end of the line 22, the trigger 28 will be swung downwardly to release the latch loop 25, when the signal arm will be swung up by the spring 27 to active position for signaling the catch. As shown in Figure 3, the trigger will swing down to engage the cross rod 13 while the latch loop will move into engagement with the free end of the trigger when the trigger will provide a stop for limiting the signal arm 23 in its upward movement. The loop 32 of the line will, of course, be disengaged from the hook 31 of the trigger, when the line will unwind from the reel, thereby automatically playing the fish until the angler arrives.

When the device is not in use, the signal arm 23 is, as shown in dotted lines in Figure 1 of the drawings, swung downwardly and the free end thereof engaged behind the upper end of the connection 16 between the sides 10 of the frame. Thus, the device may be quite compactly folded while also, accidental bending of the signal arm or other injury thereto will be obviated.

In Figure 5 of the drawings, I have shown a slight modification of the invention wherein the signal arm 33 is provided at its inner end with an angularly disposed rearwardly extending latch member 34 while the trigger 35 is formed at its inner end with an angularly disposed upwardly and forwardly extending lever 36 providing a shoulder engageable by the latch member for holding the device set.

Figure 6:
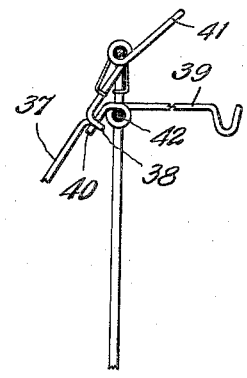

Figure 6 shows another modification wherein the signal arm 37 is provided with a latch member in the form of a transversely disposed eye 38 while the trigger 39 is formed with a downwardly and rearwardly extending lever 40 engageable through said eye to provide a stop shoulder for holding the device set. Also, in this modification, the signal arm 37 is provided at its inner end with a tail piece 41 engageable with the cross bar 42 of the frame for limiting the signal arm in its upward movement.

Figure 7:
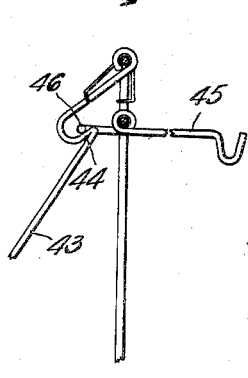

Still another modification is shown in Figure 7 wherein the signal arm 43 is formed with a rearwardly and downwardly facing U-shaped loop providing a latch member 44 while the trigger 45 is formed with a rearwardly extending lever 46 providing a shoulder engageable with said member for holding the device set.

Figure 8:
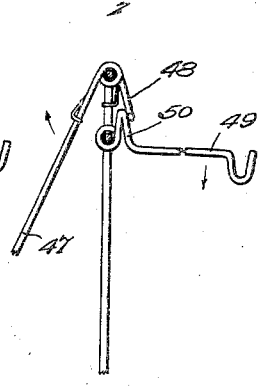

A further modification is shown in Figure 8 wherein the signal arm 47 is formed at its inner end with a rearwardly and downwardly extending latch member 48 while the trigger 49 is fashioned with an upwardly extending lever 50 providing a shoulder engageable behind said member for holding the device set. In all of these modifications, the structure, in each instance, is, except as noted, otherwise identical with the structure first described.

Figure 9:
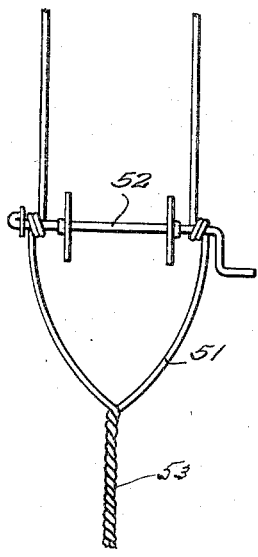
Figures 9, 10, 11 and 12 are fragmentary elevations showing modified forms of frame structure.

In Figures 9, 10, 11 and 12 of the drawings, I have shown modifications in the construction of the frame of the device. In Figure 9, the sides 51 of the frame, below the reel 52, converge in V-shape and are then twisted together to form a prong 53.

Figure 10:
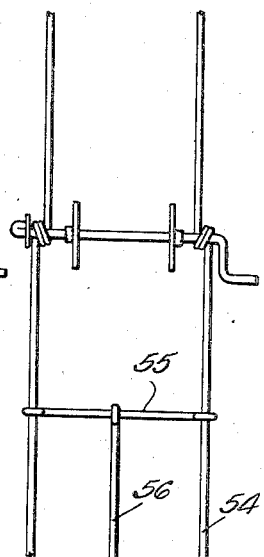

In Figure 10, the sides 54 of the frame, below the reel, extend in parallel relation to their free ends and disposed between said sides is a cross brace 55 to which is swingingly connected a prop 56 for the device.

Figure 11:
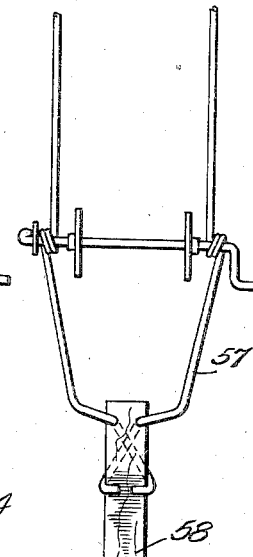

In Figure 11, the sides 57 of the frame, below the reel, converge and are bent about the upper end of a wooden or metal stake 58 for the frame, the sides of the frame gripping the stake for securely connecting the stake with the frame.

Figure 12:
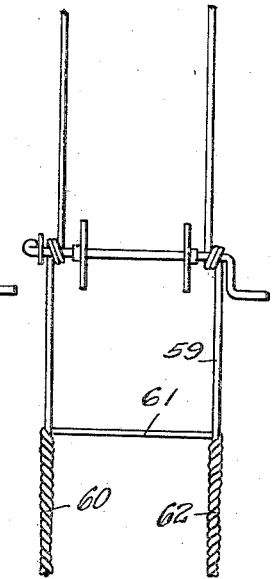

In Figure 12, the sides 59 of the frame, below the reel, extend in parallel relation and are initially of unequal length. The long side is first twisted upon itself to provide a prong 60 when the free end portion of the wire is directed across to the other side of the frame and then twisted thereabout to provide a cross brace 61 between the sides and a second prong 62 like the prong 60. Except as noted, the modifications shown in Figures 9, 10, 11 and 12 are otherwise identical with the construction first disclosed.

In connection with the several forms of the invention, it is to be noted that all parts of the device, with the exception of the flag, are preferably constructed of galvanized or rust-proof metal and while I have indicated the use of wire, which will be galvanized wire, still, other rust-resisting material may be employed. Furthermore, it is to be noted that all hinge connections and working parts will be loose and free-working to prevent freezing.

Having thus described my invention, I claim:

1. A device of the character described including a frame, a spring actuated signal arm pivoted thereon and urged upwardly to active position, and a trigger mounted to swing on the frame in a plane substantially parallel to the plane of movement of the arm and engageable with the inner end of said arm for restraining the arm in lowered position and movable to release said arm by a pull on a line engaged with the trigger.

2. A device of the character described including a frame, a spring actuated signal arm pivoted thereon and urged upwardly to active position, said arm being provided at its inner end with a latch member, and a trigger mounted to swing on the frame in a plane substantially parallel to the plane of movement of the arm and provided with a shoulder frictionally engageable with said member for restraining the arm in lowered position, the trigger being movable to release said arm by a pull on a line engaged with the trigger.

3. A device of the character described including a frame, a spring actuated signal arm pivoted thereon and urged upwardly to active position, said arm being provided at its inner end with a latch loop, and a trigger swingingly mounted on the frame and provided with a crotch forming a shoulder engageable with said loop for restraining the arm in lowered position, the trigger being movable to release said arm by a pull on a line engaged with the trigger.

4. A device of the character described including a frame having sides connected by a cross bar, a cross rod extending between said sides adjacent said bar, a spring actuated signal arm urged upwardly to active position, and a trigger engageable with the inner end of said arm for restraining the arm in lowered position and movable to release the arm by a pull on a line engaged with the trigger, the arm and trigger being swingingly mounted one on said bar and the other on said rod.

5. A device of the character described including a frame having sides, a spring actuated signal arm pivoted on the frame and urged upwardly to active position, a trigger swingingly mounted on the frame and engageable with the inner end of said arm for restraining the arm in lowered position and movable to release said arm by a pull on a line engaged with the trigger, the sides of the frame being formed with loops, and a shaft journaled through said loops and providing a reel for said line.

6. A device of the character described including a frame formed from a length of material bent to provide spaced sides connected by a cross bar, a cross rod extending between said sides adjacent said bar, the sides being bent at points below said rod to form aligned bearing loops, a spring actuated signal arm urged upwardly to active position, a trigger engageable with the inner end of said arm for restraining the arm in lowered position and movable to release said arm by a pull on a line engaged with the trigger, the arm and trigger being swingingly mounted one on said bar and the other on said rod, and a shaft journaled through said loops and providing a reel for said line.

7. A device of the character described including a frame formed from a length of material bent to provide spaced sides connected by a cross bar, a cross rod extending between the sides adjacent said bar, the sides being bent at points below the rod to form aligned bearing loops and being thence twisted together and having their free ends extended to provide diverging ice engaging prongs, a spring actuated signal arm urged upwardly to active position, a trigger engageable with the inner end of said arm for restraining the arm in lowered position and movable to release said arm by a pull on a line engaged with the trigger, the arm and trigger being swingingly mounted one on said bar and the other on said rod, and a shaft journaled through said loops and providing a reel for said line.

8. A device of the character described including a frame, a spring actuated signal arm pivoted thereon and provided at its inner end with a latch loop, means urging the arm upwardly to active position, and a trigger swingingly mounted on the frame to extend freely through said loop and provided with means engageable with the loop for restraining the arm in lowered position, the trigger being movable to release the arm by a pull on a line engaged with the trigger as well as being movable to coact with the loop for limiting the arm in its upward movement.

LEON E. GOODWIN.